United States Patent
Heaton et al.

(10) Patent No.: US 9,787,854 B2
(45) Date of Patent: *Oct. 10, 2017

(54) SYSTEM AND METHOD FOR DETERMINING AND ASSOCIATING TARIFF RATES FOR INSTITUTIONAL CALLS

(71) Applicant: Value-Added Communications, Inc., Reston, VA (US)

(72) Inventors: Kermit Dwain Heaton, Plano, TX (US); Stephen Lee Hodge, Aubry, TX (US)

(73) Assignee: Value-Added Communications, Inc., Reston, VA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/814,110

(22) Filed: Jul. 30, 2015

(65) Prior Publication Data

US 2016/0028900 A1 Jan. 28, 2016

Related U.S. Application Data (63) Continuation of application No. 14/547,900, filed on Nov. 19, 2014, which is a continuation of application
(Continued)

(51) Int. Cl.
H04M 15/00 (2006.01)
H04M 3/38 (2006.01)
H04M 15/08 (2006.01)

(52) U.S. Cl.
CPC ......... *H04M 15/8033* (2013.01); *H04M 3/38* (2013.01); *H04M 15/00* (2013.01);
(Continued)

(58) Field of Classification Search
CPC ....... H04M 15/00; H04M 15/47; H04M 15/08
(Continued)

(56) References Cited

U.S. PATENT DOCUMENTS

| 4,054,756 A | 10/1977 | Comella et al. |
| 4,191,860 A | 3/1980 | Weber |

(Continued)

FOREIGN PATENT DOCUMENTS

| WO | WO 00/72571 A2 | 11/2000 |
| WO | WO 01/44977 A2 | 6/2001 |

OTHER PUBLICATIONS

Definition of "code", Microsoft Computer Dictionary, 5th Edition, Redmond, WA: Microsoft Press, 2002; p. 106.
(Continued)

*Primary Examiner* — Nafiz E Hoque
(74) *Attorney, Agent, or Firm* — Sterne, Kessler, Goldstein & Fox P.L.L.C.

(57) ABSTRACT

A telecommunications method for call forwarding including storing information regarding a called party in at least one local database, where the information regarding the called party is stored in a user account and making a telephone call by dialing a telephone number with a telephone, where the telephone is contained in a telephone management system. The method also includes determining whether the telephone number is associated with the user account and transferring, via the switchboard, the call to the called party if the telephone number is associated with the user account, where the telephone management system is in communication with a revenue management system, and also where the revenue management system contains at least one local database.

20 Claims, 4 Drawing Sheets

Related U.S. Application Data

No. 12/456,204, filed on Jun. 12, 2009, now Pat. No. 8,929,524, which is a continuation-in-part of application No. 10/832,987, filed on Apr. 27, 2004, now Pat. No. 9,014,355.

(52) U.S. Cl.
CPC ........... *H04M 15/08* (2013.01); *H04M 15/47* (2013.01); *H04M 15/58* (2013.01); *H04M 15/887* (2013.01); *H04M 2215/0148* (2013.01); *H04M 2215/0188* (2013.01); *H04M 2215/62* (2013.01)

(58) Field of Classification Search
USPC ........................................ 379/114.14, 127.01
See application file for complete search history.

(56) References Cited

U.S. PATENT DOCUMENTS

| | | | |
|---|---|---|---|
| 4,935,956 | A | 6/1990 | Hellwarth et al. |
| 5,319,702 | A | 6/1994 | Kitchin et al. |
| 5,535,596 | A | 7/1996 | Todack |
| 5,539,812 | A | 7/1996 | Kitchin et al. |
| 5,563,931 | A | 10/1996 | Bishop et al. |
| 5,638,430 | A | 6/1997 | Hogan et al. |
| 5,655,013 | A | 8/1997 | Gainsboro |
| 5,684,866 | A | 11/1997 | Florindi et al. |
| 5,768,355 | A | 6/1998 | Salibrici et al. |
| 5,774,533 | A | 6/1998 | Patel |
| 5,778,313 | A | 7/1998 | Fougnies |
| 5,854,975 | A | 12/1998 | Fougnies et al. |
| 5,867,562 | A | 2/1999 | Scherer |
| 5,870,672 | A | 2/1999 | Stoddard et al. |
| 5,875,236 | A | 2/1999 | Jankowitz et al. |
| 5,887,249 | A | 3/1999 | Schmid |
| 5,937,043 | A | 8/1999 | He |
| 6,052,454 | A | 4/2000 | Kek et al. |
| 6,393,269 | B1 | 5/2002 | Hartmaier et al. |
| 6,430,274 | B1 | 8/2002 | Winstead et al. |
| 6,570,970 | B2 | 5/2003 | Gruchala et al. |
| 6,577,718 | B1 | 6/2003 | Kalmanek, Jr. et al. |
| 6,614,781 | B1 | 9/2003 | Elliott et al. |
| 6,639,977 | B1 | 10/2003 | Swope et al. |
| 6,819,932 | B2 | 11/2004 | Allison et al. |
| 6,836,540 | B2 | 12/2004 | Falcone et al. |
| 7,042,992 | B1 | 5/2006 | Falcone et al. |
| 7,054,430 | B2 | 5/2006 | Lynam et al. |
| 7,079,636 | B1 | 7/2006 | McNitt et al. |
| 7,080,049 | B2 | 7/2006 | Truitt et al. |
| 7,106,843 | B1 | 9/2006 | Gainsboro et al. |
| 7,184,747 | B2 | 2/2007 | Bogat |
| 7,197,560 | B2 | 3/2007 | Caslin et al. |
| 7,333,798 | B2 | 2/2008 | Hodge |
| 7,496,345 | B1 | 2/2009 | Rae et al. |
| 7,505,406 | B1 | 3/2009 | Spadaro et al. |
| 7,766,223 | B1 | 8/2010 | Mello et al. |
| 7,899,167 | B1 | 3/2011 | Rae |
| 8,014,800 | B2 | 9/2011 | Törnkvist |
| 8,295,446 | B1 | 10/2012 | Apple et al. |
| 8,355,492 | B1 | 1/2013 | Polozola et al. |
| 8,477,766 | B2 | 7/2013 | Kwon |
| 8,489,068 | B1 | 7/2013 | Edwards et al. |
| 8,577,003 | B2 | 11/2013 | Rae |
| 8,626,118 | B2 | 1/2014 | Smith et al. |
| 8,794,509 | B2 | 8/2014 | Bishop et al. |
| 8,929,524 | B2 | 1/2015 | Hodge |
| 9,014,355 | B2 | 4/2015 | Heaton et al. |
| 2002/0041660 | A1 | 4/2002 | Nakamura |
| 2002/0131374 | A1 | 9/2002 | Lee |
| 2002/0143655 | A1 | 10/2002 | Elston |
| 2002/0168060 | A1 | 11/2002 | Huie |
| 2002/0183040 | A1 | 12/2002 | Lundstrom et al. |
| 2003/0002639 | A1 | 1/2003 | Huie |
| 2003/0086546 | A1 | 5/2003 | Falcone et al. |
| 2003/0193961 | A1 | 10/2003 | Moore et al. |
| 2003/0220884 | A1 | 11/2003 | Choi et al. |
| 2004/0029564 | A1 | 2/2004 | Hodge |
| 2004/0058667 | A1 | 3/2004 | Pienmaki et al. |
| 2004/0114739 | A1 | 6/2004 | Hausmann et al. |
| 2004/0153396 | A1 | 8/2004 | Hinderer |
| 2004/0173674 | A1 | 9/2004 | Matsuura |
| 2005/0009525 | A1 | 1/2005 | Evslin |
| 2005/0123111 | A1 | 6/2005 | Philbin et al. |
| 2005/0135579 | A1 | 6/2005 | Creamer et al. |
| 2005/0238154 | A1 | 10/2005 | Heaton et al. |
| 2006/0098796 | A1 | 5/2006 | Link |
| 2006/0149644 | A1 | 7/2006 | Sulmar et al. |
| 2007/0155411 | A1 | 7/2007 | Morrison |
| 2007/0263812 | A1 | 11/2007 | Polozola et al. |
| 2008/0175362 | A1 | 7/2008 | Bangor et al. |
| 2008/0220739 | A1 | 9/2008 | Muoio et al. |
| 2009/0042539 | A1 | 2/2009 | Jiang et al. |
| 2009/0054031 | A1 | 2/2009 | Smith et al. |
| 2009/0304166 | A1 | 12/2009 | Hodge |
| 2012/0202454 | A1 | 8/2012 | Smith et al. |
| 2015/0078541 | A1 | 3/2015 | Hodge |
| 2015/0229776 | A1 | 8/2015 | Heaton et al. |

OTHER PUBLICATIONS

Non-Final Office Action in U.S. Appl. No. 14/689,521, mailed Dec. 18, 2015; 9 pages.

Notice of Allowance in U.S. Appl. No. 14/689,521, mailed Mar. 15, 2016; 8 pages.

U.S. Appl. No. 12/766,159, "System and Method for Completion of All Calls Using Single Call Funding Options," to Edwards et al., filed Apr. 23, 2010; 39 pages.

Definitions of "code," "comprise", "number", and "including", The American Heritage College Dictionary, 3rd Edition (Houghton Mifflin Company, 1997); 10 pages.

Wireless Interconnection and Reciprocal Compensation Agreement Between Community Telephone Company and United States Cellular Corporation, Apr. 24, 2006; 29 pages.

Definition of "circuit switching", Newton's Telecom Dictionary, New York: Flatiron Publishing, Inc., 1996; p. 253.

File History of U.S. Appl. No. 14/703,639, filed May 4, 2015; 189 pages.

Rosenberg, et al., "SIP: Session Initial Protocol," Network Working Group, Standard Track, Jun. 2002; 269 pages.

"VoIP Adoption Still Growing in Consumer and Business Markets," accessed at http://www.voicewalker.net/news/voip-adoption-stillgrowing-in-consumer-and-business-markets/, archived by web.archive.org on Jul. 28, 2012; 2 pages.

McKitterick et al., "State of the Art Review of Mobile Payment Technology," Department of Computer Science, Trinity College Dublin; 22 pages.

The Line Information Database (LIDB) and Wireless Services, Telcordia Technologies White Paper, Dec. 2001; 31 pages.

Confalone et al., "Calling Card Service—TSPS Hardware, Software, and Signaling Implementation," The Bell System Technical Journal, Sep. 1982, vol. 61, No. 7; pp. 1675-1714.

Ahimovic et al., "Services for Tomorrow's PCS," IEEE International Conference on Universal Personal Communications, vol. 1, Oct. 12-15, 1993; pp. 222-227.

Operator Service System Generic Requirements, OSSGR, TR-TSY-000271, Collect Billing, Rev. 3, Mar. 1988; 50 pages.

1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.

"1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages."

"Automated Coin Toll System (ACTS)," Telephone World, accessed at http://www.phworld.org/payphone/acts.htm, archived by web.archive.org on Feb. 28, 2009.

(56) References Cited

OTHER PUBLICATIONS

Photocopy of "Bellcore Notes on the Networks (Formerly BOC Notes on the LEC Networks)," Bellcore, Special Report SR-2275, Issue 3, Dec. 1997.
Digital Copy of "Bellcore Notes on the Networks," Bellcore, Special Report SR-2275, Issue 3, Dec. 1997.
"Cisco IAD2400 Series Business-Class Integrated Access Device", Cisco Systems Datasheet, 2003.
"Customer Owned Coin Operated Telephones (COCOT)," Telephone World, accessed at http://www.phworld.org/payphone/cocot.htm, archived by web.archive.org on Jan. 27, 2009.
"History and Key Milestones," Logica, accessed at http://www.logica.com/history+and+key+milestones/350233679, archived by web.archive.org on Dec. 24, 2009.
"SIP and IPLinkTM in the Next Generation Network: An Overview," Intel, 2001.
"Survey of Telephone Switching: Chapter 11," Telephone Tribute, accessed at http://www.telephonetribute.com/switches survey chapter 11 .html, archived by web.archive.org on Jul. 14, 2009.
"Voice Over Packet in Next Generation Networks: An Acrhitectural Framework," Bellcore, Special Report SR-4717, Issue 1, Jan. 1999.
"Criminal Calls: A Review of the Bureau of Prisons' Management of Inmate Telephone Privileges," U.S. Department of Justice, Office of the Inspector General, Aug. 1999.
"Why Can't You Make a Collect Call to Cell Phone," National Public Radio, Jun. 30, 2008, Accessed via http://www.npr.org/templates/story/story.php?storyId=92021561 on Apr. 6, 2015.
Assignment of U.S. Pat. No. 8,190,121 and U.S. Appl. No. 13/449,308.
Brown, et al., "SMS: The Short Message Service," Computere, vol. 40, No. 12, 2007.
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002)
Clifford J. Weinstein, MIT, The Experiential Integrated Switched Network—A System-Level Network Test Facility (IEEE 1983).
Commander Call Control System, Rev. 1.04 (Science Dynamics 2002).
Definitions of "Local Area Network (LAN)" and "Wide Area Network (WAN)," Microsoft Computer Dictionary (Microsoft Press 2002), pp. 304 and 561.
Disclaimer filed Jul. 31, 2014 in U.S. Appl. No. 12/969,068 (U.S. Pat. No. 8,477,766).
File History of U.S. Pat. No. 7,899,167, U.S. Appl. No. 10/642,532, filed Aug. 15, 2003.
File History of U.S. Pat. No. 8,190,121, U.S. Appl. No. 12/103,138, filed Apr. 15, 2008.
File History of U.S. Pat. No. 8,489,068, U.S. Appl. No. 12/766,159, filed Apr. 23, 2010.
File History of U.S. Pat. No. 8,577,003, U.S. Appl. No. 13/009,483, filed Jan. 19, 2011.
File History of U.S. Pat. No. 8,626,118, U.S. Appl. No. 13/449,308, filed Apr. 17, 2012.
Reexamination U.S. Appl. No. 90/012,802 of U.S. Pat. No. 8,190,121, filed Mar. 1, 2013.
Garner, et al., "Mobile Terminated SMS Billing—Exploits and Security Analysis," IEEE International Conference on Information Technology: New Generations, 2006.
Ismail, et al., "Prepaid and Postpaid VoIP Service Enhancements 1013 and Hybrid Network Performance Measurement," Information Technology Journal, vol. 5, Issue 2, 2006.
Jeff Hewett and Lee Dryburgh, Signaling System No. 7 (SS7/C7): Protocol, Architecture, and Services (Networking Technology) at 85 (Cisco Press, Jun. 2005).
Final Office Action in U.S. Appl. No. 10/832,987, mailed Apr. 13, 2010; 16 pages.
Final Office Action in U.S. Appl. No. 10/832,987, mailed Apr. 14, 2009; 17 pages.
Final Office Action in U.S. Appl. No. 10/832,987, mailed Jun. 21, 2011; 18 pages.
Final Office Action in U.S. Appl. No. 12/456,204, mailed Jul. 3, 2014; 12 pages.
Final Office Action in U.S. Appl. No. 12/456,204, mailed May 20, 2013; 10 pages.
Non-Final Office Action in U.S. Appl. No. 10/832,987, mailed Dec. 8, 2010; 20 pages.
Non-Final Office Action in U.S. Appl. No. 10/832,987, mailed Jul. 16, 2008; 16 pages.
Non-Final Office Action in U.S. Appl. No. 10/832,987, mailed May 22, 2014; 6 pages.
Non-Final Office Action in U.S. Appl. No. 10/832,987, mailed Oct. 6, 2009; 15 pages.
Non-Final Office Action in U.S. Appl. No. 10/832,987, mailed Oct. 9, 2013; 20 pages.
Non-Final Office Action in U.S. Appl. No. 10/832,987, mailed Sep. 3, 2014; 22 pages.
Non-Final Office Action in U.S. Appl. No. 12/456,204, mailed Aug. 28, 2012; 7 pages.
Non-Final Office Action in U.S. Appl. No. 12/456,204, mailed Dec. 17, 2013; 10 pages.
Notice of Allowance in U.S. Appl. No. 10/832,987, mailed Jan. 28, 2015; 5 pages.
Notice of Allowance in U.S. Appl. No. 12/456,204, mailed Oct. 21, 2014; 11 pages.
Office Action directed to European Patent Application No. 03 772 898.7, mailed Jun. 9, 2008.
Osifchin, N., "A Telecommunications Buildings/Power Infrastructure in a New Era of Public Networking," IEEE 2000.
PacketCableTM 1.0 Architecture Framework Technical Reprot, PKT-TR-ARCH-V0 1-001201 (Cable Television Laboratories, Inc. 1999).
Pages from http://www.corp.att.com/history, archived by web.archive.org on Nov. 4, 2013.
Rey, R.F., ed., "Engineering and Operations in the Bell System," 2nd Edition, AT&T Bell Laboratories: Murray Hill, NJ, 1983.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_main.htm (archived by web.archive.org on Oct. 12, 2000).
Sundstrom, K., "Voice over IP: An Engineering Analysis," Master's Thesis, Department of Electrical and Computer Engineering, Unviersity of Manitoba, Sep. 1999.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.
Valcourt, et al., "Investigating mobile payment: Supporting technologies, methods, and use," IEEE International Conference on Wireless and Mobile Computing, Networking, and Communication, 2005.
U.S. Appl. No. 14/689,521, to Heaton, et al., "Telecommunication Revenue Management System," filed Apr. 17, 2015.
Notice of Allowance for U.S. Appl. No. 14/689,521, mailed May 18, 2016; 9 pages.
Excerpts from the Prosecution History of U.S. Appl. No. 10/135,878, filed Apr. 29, 2002.
Definition of "telephony", McGraw-Hill Dictionary of Scientific and Technical Terms, 6th Edition (McGraw-Hill, 2003).
Response to Office Action, filed Jan. 6, 2009, in Prosecution History of U.S. Appl. No. 10/642,532, filed Aug. 15, 2003.

(56) References Cited

OTHER PUBLICATIONS

Final Office Action in U.S. Appl. No. 14/547,900, dated May 3, 2017; 13 pages.
Notice of Allowance for U.S. Appl. No. 14/689,521, dated Sep. 23, 2016; 9 pages.

SYSTEM AND METHOD FOR DETERMINING AND ASSOCIATING TARIFF RATES FOR INSTITUTIONAL CALLS

CROSS-REFERENCE TO RELATED APPLICATIONS

This application is a Continuation application of U.S. application Ser. No. 14/547,900, filed Nov. 19, 2014, which is a Continuation application of U.S. application Ser. No. 12/456,204, filed Jun. 12, 2009, now U.S. Pat. No. 8,929,524, issued Jan. 6, 2015, which is a Continuation-in-Part application of U.S. application Ser. No. 10/832,987, filed Apr. 27, 2004, now U.S. Pat. No. 9,014,355, issued Apr. 21, 2015, the entire contents of which are herein incorporated by reference.

FIELD OF THE INVENTION

The invention relates generally to revenue management in telecommunications systems in penal institutions or similar facilities. In particular, the invention relates to a revenue management system with the means to block call forwarding and tariff circumvention and bill at a long distance rate for calls originating from the penal institution.

BACKGROUND OF THE INVENTION

Common forms of interaction between residents of many institutions, such as prisons, nursing homes, mental institutions, etc., include site visits and telephonic communication. For the purposes of simplicity, discussion will be limited to inmates within a correctional facility.

Site visits from, for example, an inmate's family, attorney, etc. to a penal institution, are often not economically or physically possible. The inability of visitors to make site visits to the inmate results from such factors as the distance from and costs incurred to travel to the institution. In addition, it is costly and difficult for some institutions to provide monitoring and security for the visitors to allow controlled inmate communication with external parties.

An alternative to site visits is telephonic communication. However, this poses other problems. Some visitors may be several time zones away from the penal institution making telephonic communication difficult and even prohibitive. Additionally, telephonic communication between external parties and inmates can prove expensive.

Moreover, the need to monitor, control, record and provide detailed records of the usage of a telephone system in a controlled institutional environment is well recognized. It is common to utilize a controlled telephone system capable of monitoring outgoing telephone connections in many types of institutional environments, such as, but not limited to, penal institutions, military institutions, hospitals, schools, businesses, or specific types of government institutions. The reasons for monitoring and controlling institutional telephone systems are evident. To prevent such institutions from incurring unaccountable telephone costs, the institutions must either restrict access to outbound telephone lines or employ a debit system to charge the calling party for the outbound telephone call. Otherwise, unaccountable telephone costs would severally hinder the availability of the telephone systems in institutions.

However, it is often impossible to recover debt accumulated when no payment is received for completed collect calls that originate from a secure institution, such as a penal institution. The greatest portion of debt occurs because the called party cannot or will not pay the invoice. Collection efforts are made by the Local Exchange Carriers ("LECs") billing the calls, but unpaid balances are eventually written off. In addition, most LECs are slow to report bad debt experience, sometimes as much as eighteen months in arrears. As a result, information provided by the billing process is not helpful to prevent additional losses due to non-payment from the same individual.

Additionally, some small independent local exchange carriers ("ILECs") do not offer billing services to their customers. As a result, any collect calls placed to these ILECS are un-billable. Similarly, with the advent of local competition, there are a great number of Competitive Local Exchange Carriers ("CLECs") offering local services to both residential and business customers. These carriers do not offer billing services to their customers. The only way to identify these customers after billing is attempted and is returned as un-billable by a Billing Clearinghouse. However, this notification may not be received until two weeks after the collect call placement.

Also, on occasion, certain customers of LECs elect to place their telephone number on collect call block so that no telephone calls may be placed to that customer's telephone number. This is a common service provided by most LECs. Each LEC maintains an independent Line Information Database ("LIDB") which stores all customer account options, such as collect call block. On occasion, a collect call block is placed on the called party's telephone in between the time the collect call is placed and when the call is submitted for billing. In these cases, the LEC that would have ordinarily billed the call can reject the call record, thereby making the telephone call un-billable.

Furthermore, many penal institutions limit access to calls placed by inmates. One reason for controlling use of the system is to prevent the institution from incurring unaccountable telephone costs. Other reasons for controlling access to the system include preventing harassing calls to outside parties, preventing fraudulent activities, etc. Therefore, systems in such environments often monitor and control the telephone activity of each inmate or resident. For example, systems may restrict calling to only certain telephone numbers. Systems may also have a means of maintaining call records for each inmate or resident, and a means for communicating with called parties to enable the called parties to prevent future telephone calls from inmates or residents. In short, the communications system used in a regulated institution must employ unique monitoring and control functions often unnecessary in other types of telecommunications systems.

Therefore, in order for the methods of monitoring and control to be effective, it is important to prevent inmates or residents from exploiting any loop-holes that can be used to bypass the control features of the system, such as through call forwarding. For example, inmates or residents have been known to use three-way calling as a way to utilize call forwarding by having an outside party connect the inmate or resident to a blocked number. A three-way call is initiated when the remote called party depresses the hook switch on the telephone, generating a hook flash signal. The caller is temporarily put on hold while the called party establishes a connection with a third party. Then, all three parties can converse. Using three-way calling, the inmate or resident may utilize the institution's call system to, among other things, access blocked telephone numbers, for example, to perpetrate additional criminal activities, or harass certain parties. Also, through three-way calling, the calling party has effectively found a way to utilize call-forwarding, albeit, all three parties listening in on the call. Also, the institution may not be able to charge for this service, thereby foregoing any additional revenues that could be generated.

Inmates have also circumvented the controls implemented by institutions by using remote call forwarding through the methods of automatic call forwarding. In these methods, calls coming to a call forwarding number are automatically forwarded to any answering location designated by the family member. These methods are implemented by purchasing a LEC number and having the incoming call be diverted to a long-distance number, outside the LEC where the family member resides. Other methods to automatically divert calls include selecting, for example, *72 at a LEC number and having the call forwarded to a remote location. Once more, the institutions are only able to detect the local telephone number and, accordingly, bill at the LEC rate, thereby foregoing additional revenues that could have been collected had they billed at the long-distance rate.

Yet further, end users (such as family members) have utilized number portability to enable these end users to retain their telephone numbers when moving from one physical location to another. These numbers, may be originally set up with the LEC, however, due to number portability, the end users are located in a different geographic location. As such, the institution is only able to detect the local telephone number and, accordingly, bill at the LEC rate, thereby foregoing additional revenues that could have been generated.

In view of the foregoing, a need clearly exists for an improved revenue management system for managing calls placed using an institution's telephone call system utilizing a local database to establish user number and accounts. In particular, a need exists in the art for a revenue management system capable of generating revenue for long-distance calls that are made from the institution and one that is capable of establishing debit accounts for a called party, and one that is capable of verifying if a call placed to the called party is billable by checking the telephone number against a Local Exchange Carrier databases or a Local Number/Mobile Number/VoIP Portability database.

SUMMARY OF THE INVENTION

The invention embodies a revenue management system for use with a pre-existing telephone management system. A telephone management system compatible with the invention is disclosed in U.S. Pat. No. 7,333,798, which is hereby incorporated by reference in its entirety. The invention designed to generate revenues for the institution for telephone calls that may not ordinarily be made in the absence of the call forwarding number. Additionally, the invention may reduce a telephone management system's expenses associated with calls that are un-billable and/or un-collectible through the use of validation databases and alternative payment methods. In addition to minimizing losses resulting from un-billable calls, the revenue management system provides a means and method for regaining lost opportunity by providing family members with alternative solution for calls to parties that would otherwise not be made due to long-distance tariff charges incurred by the inmate which may now be completed using the revenue management system of the invention. This system may be implemented in a variety of facilities including, but not limited to, penal institutions or similar facilities such as mental institutions, nursing homes, rehabilitation centers, correctional facilities, government agencies, private and public business, and the like.

A primary object of the invention is to provide a revenue management system capable of being used with a pre-existing telephone management system and which is designed to provide a means to generate revenues by providing alternative calling options.

Typically, telephone management systems compatible with the invention consist of a multitude of telephones connected to a switchboard device. The switchboard device routes calls, performs voice prompts, and responds to menu selections. Telephone calls placed by users of the telephone management system are routed through the switchboard device and connected to the proper outgoing trunk based on the type of call placed (e.g., collect, debit, etc.). An integrated cross point switch enables any telephone to access any available outgoing trunk.

The switchboard device is connected to a site server, which is commonly referred to as an ITAC (Inmate Telephone Access Control) in penal institutions or UTAC (User Telephone Access Control) in certain other types of institutions. This device serves as the main database for the telephone management system. It has the ability to log and record details of all telephone calls placed through the system and store them for a period of time defined by the institution. A recorder, which may be integral to the system or remote to the system as a separate storage means attached to the ITAC/UTAC, is responsible for recording the telephone calls and storing them in one or more databases depending on the size of the institution or the amount of data which must be archived by the institution and the capability of the storage means.

Connected to the ITAC/UTAC are a number of administrative and investigative workstations used to create, edit, and monitor user accounts and telephone calls. The investigative workstations may be used to listen to the outgoing telephone calls in real time or to access calls stored on the server or other type of database or storage means.

User-friendly software utilizing a GUI (graphical user interface) or other types of OSD capable devices may be employed to administer all user accounts of the telephone management system. The software allows a system administrator to provide calling restrictions at all levels of operation. Such restrictions may include, but are not limited to, the total number of minutes allowed, the total number of calls placed, date and time calls are allowed, and other like restrictions.

The revenue management system of the invention may be connected to the telephone management system in a variety of ways. It may be located at the same location as the telephone management system or at a remote location. For example, the two systems may be connected utilizing the Public Switched Telephone Network ("PSTN"), connected via a direct T1 line interconnecting the electronic switchboard device of the telephone management system to a remote server located in the revenue management system, etc. The revenue management system is comprised of a remote server connected to a multitude of local and external telephone number databases and a user database. The remote server utilizes the connected databases to determine if an outbound telephone call initiated at the telephone management system is billable. The user database contains financial information associated with each account established with the revenue management system.

The called party begins the process of setting up an account by requesting that a fixed telephone number, a wireless telephone number, or a VOIP phone number be associated with the called party. The called party dials a toll-free telephone number for setting up an account with the revenue management system. Optionally, the system may instruct the called party to dial a DTMF digit indicating that they wish to establish a credit account.

If the called party elects to set up an account with the revenue management system, the called party is routed to a revenue management system (RMS) representative. The RMS representative acquires identification and geographic information from the called party necessary to create an account. The information requested may include, but is not limited to, a first and last name, a street, address, a city, a state, a country, a zip code, called party telephone number, a social security number, a credit card number and expiration date, and a bank account number and associated routing code. The RMS representative enters the requested information into the user database as it is received from the called party. Once all of the required information has been entered by the RMS representative, the called party telephone number is checked in the Local Exchange Carrier ("LEC") databases to determine whether the called party telephone number is a local number. Upon determining that the telephone number is not an LEC billable number, the RMS representative requests credit card billing address and zip code to verify the credit card information provided is associated with the called party. Also, the telephone number of the called party is checked to verify that is located in the zip code provided. The called party's account is activated after all checks are completed and are positive.

Alternatively, the called party account is mailed a card to the address provided by the called party. The card includes a toll phone number and code, which is used to activate the account. The called party calls the toll free phone number and provides the code included to confirm the address. Also, a calling number identification (also called caller id) is retrieved, upon making the call, to determine whether the called party is calling from a telephone number that is in the same geographic location as the called party telephone number being registered in the new account that is being set up. The account is activated upon performing the process and the called party's telephone number is verified.

The revenue management system of the invention is utilized each time a call is placed by a user of the telephone management system. Typically, an inmate will choose at the beginning of the call whether the call will be debit (using either inmate funds or called party funds) or collect. In one non-limiting example, the inmate may dial a "1" prefix for debiting the inmates funds, a "3" prefix to debit funds of the called party, or a "0" prefix for a collect call. It should be appreciated that the "1" prefix or the "3" prefix is provided for illustrative purposes, and the inmate may dial any other assigned prefixes to place either a debit or a collect call. For example, if a "1" prefix or a "3" prefix is dialed, then the telephone number information is routed from the site server of the telephone management system to the remote server of the revenue management system. The revenue management system first determines if the outbound telephone number includes information associated with an account in the revenue management system by accessing a revenue management system ("RMS") database connected to the remote server. If the telephone number is located in the RMS database, the remote server queries a user database attached to the remote server to determine if the telephone number associated with the account is active or not blocked. If the telephone number is not active or blocked, the remote server sends a signal to the site server directing it to terminate the telephone call attempt.

If the telephone number is not blocked, the user database is next queried to determine if the funds associated with the account are below a predetermined threshold. If the funds located in the account are below the predetermined threshold, the remote server instructs the site server to play a warning message to the called party when a "3" prefix was dialed, or play a warning message to the inmate when a "1" prefix was dialed. The warning message indicates that the funds are low and the account funds will be replenished with additional funds from the credit card information associated with the account or that the inmate is required to deposit additional funds into the account through, in one non-limiting example, a commissary account, or a credit card of an external party. The remote server then instructs the site server to dial the telephone number. The remote server then completes the outbound telephone call by dialing the called party's telephone number and redirecting the inmate to the called party thereby completing the outbound telephone call. Once the outbound telephone call has been completed, the site server sends a signal to the remote server indicative of the length of the telephone call. The remote server utilizes this information to deduct the appropriate funds from the appropriate calling party's or called party's account.

Alternatively, if the telephone number associated with the called party does not have an associated account in the RMS database, the user is given the option of placing a collect call by selecting a "0" prefix. The telephone number information is routed from the site server of the telephone management system to the remote server of the revenue management system. The revenue management system next determines if the collect call is billable by checking the dialed telephone number against several telephone number databases.

The remote server first checks the dialed telephone number against the CLEC database. The CLEC database contains a list of all telephone numbers associated with parties that utilize the local telephone services of a Competitive Local Exchange Carrier. Generally, parties that utilize the services of a Competitive Local Exchange Carrier may not be not billable for collect calls passed onto them by the institution where the party is located if the CLEC permits collect calls. Each outbound telephone call is validated against the CLEC database. The remote server also checks the dialed telephone number against a Local Number Portability (LNP) database that includes local number portability information for fixed lines, a Mobile Number Portability (MNP) database for information on mobile phone lines. Additionally, the remote server may check for calls made through the VOIP environment. The dialed telephone number is blocked if it is located in the CLEC database, the LNP or MNP databases. If the status of the outbound telephone number is not determined by accessing the RMS database or the CLEC database, the remote server next queries external remote databases, the Line Information Database ("LIDB") and ON-NET database. The LIDB is a nationally maintained database of all active telephone numbers in the North American Dialing plan. The LIDB query returns a negative result if the telephone number queried is collect call restricted by either the called party or the local exchange carrier, a cellular telephone, or a payphone. That is, if a negative result is returned from the LIDB, the telephone number is un-billable. If a negative result is returned, the remote server adds the dialed telephone number to the CLEC database and sends a signal to the site server instructing it to terminate the outbound telephone call. If the telephone number is not found in the LIDB, the remote server queries the ON-NET database. The ON-NET database is a billing clearinghouse specific database of area codes and exchanges for which billing agreements exist with the dominant/default local carrier. That is, the ON-NET database contains a list of all area codes and exchanges which are billable for collect calls. If the dialed telephone number's area code and exchange is not in the ON-NET database, the remote server sends a signal to the site server directing it to terminate the outbound telephone call. In other non-limiting embodiments, remote server identifies information from a Common Channel Signaling System 7 (also called Signaling System Number 7) to retrieve call-setup information in order to verify that the call is a forwarded call. The remote server blocks the call if the information indicates it is a forwarded telephone call.

Therefore, it is an object of the invention to provide a revenue management system to manage risk associated with un-billable calls and bad debt generated through calling activity.

It is another object of the invention to provide a revenue management system capable of interfacing with a pre-existing telephone management system.

It is a further object of the invention to reduce exposure to un-billable telephone calls through the use of novel calling methods.

Furthermore, it is an object of the invention to generate revenue through billing for long-distance calls.

It is an additional object of the invention to provide a revenue management system capable of operating remote from the telephone management system that it services.

In a first non-limiting aspect of the invention, a telecommunications management system includes a telephone for making a telephone call, where the telephone is contained in a telephone management system, where the telephone dials a telephone number of or associated with a user account. The system also includes a revenue management system in communication with the telephone management system and at least one local database located in the revenue management system. The local database contains geographic information regarding the user account, where the information regarding the user account contains information regarding a called party.

In a second non-limiting aspect of the invention, a telecommunications method for call forwarding includes four steps. In a first step, information regarding a called party is stored in at least one local database, where the information regarding the called party is stored in a user account. In a second step, a telephone call is made by dialing a telephone number with a telephone, where the telephone is contained in a telephone management system. In a third step, it is determined whether the telephone number is associated with the user account with a processor. In the fourth step, the call is transferred to the called party if the telephone number is associated with the user account, where the telephone management system is in communication with a revenue management system. Also, the revenue management system contains at least one local database.

Other objects, features, and characteristics of the invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE DRAWINGS

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment of the invention.

Figure 1:
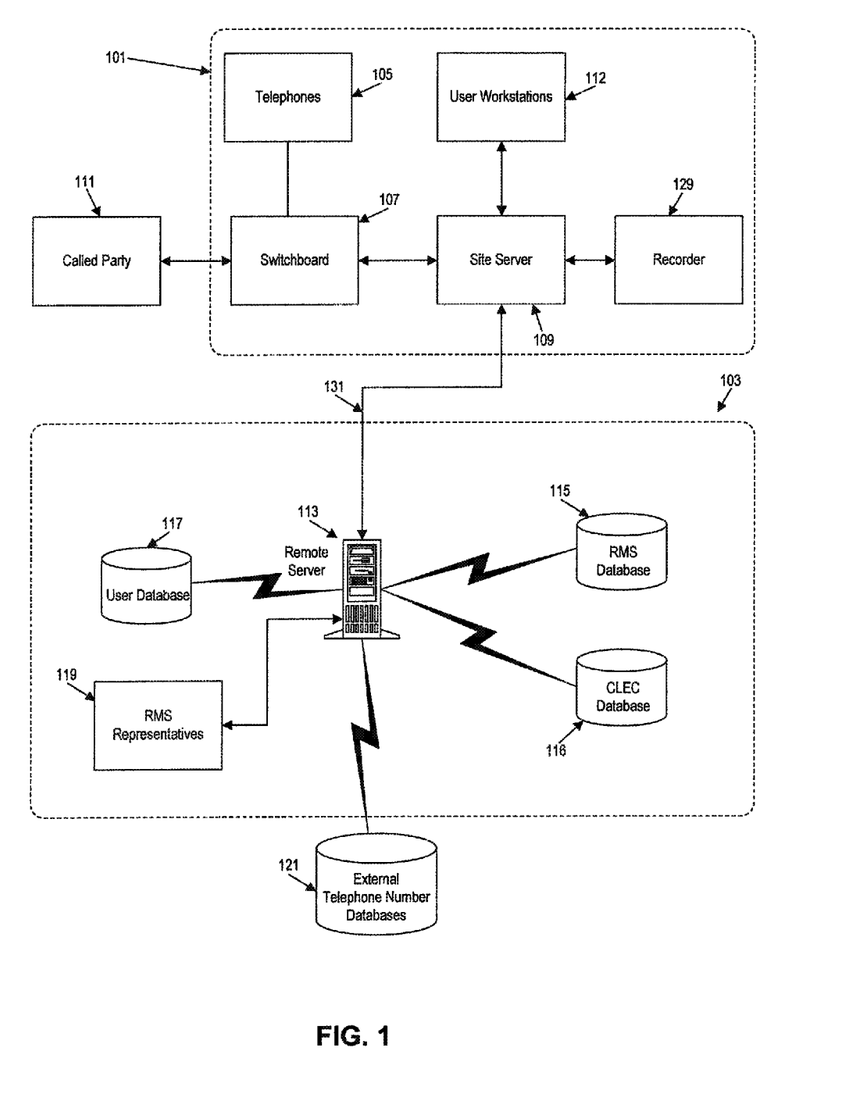
FIG. 1 depicts the architecture of the preferred embodiment illustrating the connection of a telephone management system to the revenue management system of the invention.

Referring first to FIG. 1, shown is the connection of a telephone management system 101 to the revenue management system 103 according to the invention. Telephone management system 101 is preferably any type known in the art and may consist of a plurality of telephones 105, switchboard device 107, site server 109, and user workstation 112. Switchboard device 107 is capable of routing telephone calls, performing voice prompts, and responding to menu selections. Calls placed by users utilizing telephones 105 within telephone management system 101 are routed through switchboard device 107 and connected to telephone number 111 of the called party 114. An integrated cross point switch (not shown) located in switchboard device 107 enables any telephone 105 to be utilized to dial the desired telephone number of the called party 114 111. Telephone number 111 is preferably connected to telephone management system 101, although in another non-limiting embodiment, call forwarding number 111 may be remotely located from telephone management system 101.

Switchboard device 107 is preferably connected to site server 109, which is commonly referred to as an ITAC (Inmate Telephone Access Control) in penal institutions or UTAC (User Telephone Access Control) in certain other types of institutions. Site server 109 serves as the main processing unit for telephone management system 101. Site server 109 has the ability to log and record details of all telephone calls placed from telephones 105 and store them for a period of time defined by the institution. Recorder 129, which may be integral to the system or remote to site server 109, is responsible for recording the telephone calls and storing them in one or more databases depending on the size of the institution or the amount of data that must be archived by the institution and the capability of the storage means.

Connected to site server 109 are a multitude of user workstations 112 used to create, edit, and monitor user accounts and telephone calls. User workstations 112 may be used to listen to the outgoing telephone calls in real time or to access calls stored on site server 109 or another type of database or storage means.

User-friendly software, located on site server 109 or user workstations 112, utilizing a graphical user interface ("GUI") or other type of on-screen display capable device may be employed to administrate the user accounts of telephone management system 101. This software may allow a system administrator to provide calling restrictions at all levels of operation. Such restrictions may include, but are not limited to, the total number of minutes allowed, the total number of calls placed, dates and times calls are allowed, the frequency of usage of the call forwarding number, and other like restrictions.

Revenue management system 103 preferably comprises RMS server 113, which may be remotely located from the RMS server 113, a RMS database 115, a CLEC database 116, a user database 117, a RMS representatives 119, a LNP database 118, and a MNP database 120. In the preferred embodiment of the invention, site server 109 of telephone management system 101 is connected to RMS server 113 of revenue management system 103 via direct connection 131, which may be a dedicated T1 line, T3 line, etc. or other optional connection. A called party 114, preferably a family member of an inmate in a penal institution, may request that a telephone number 111 be associated with the called party 114 in the revenue management system 103 so that calls may be originated from the institution and billed accordingly. For further discussion, the telephone number 111 may be a fixed line LEC number, a mobile number, a VOIP number or a fixed line long-distance number. The telephone number 111 is associated with an account in user database 117, and all calls made to the telephone number 111 are routed to the called party 114 associated with the telephone number 111. The RMS Server 113 associates the telephone number 111 with an account associated with the called party 114 and stores it in the RMS database 115, where the account includes, among other information, geographic location of the called party 114. In some instances, if the telephone number 111 of the called party 114 is located in a different geographic region than the penal institution, calls made to the telephone number 111 are charged at the appropriate long distance tariff rate. All calls made to the telephone number 111 are preferable prepaid by the called party 114. So, telephone calls utilizing the revenue management system 103 are cheaper to the called party 114, rather than paying for calls that are originated by an inmate utilizing a long-distance service in the absence of a pre-paid account.

The RMS server 113 queries the telephone number 111 of the called party 114 against the RMS database 115, CLEC database 116, LNP database 118, MNP database 120, and external and remote Line Item database 121 ("LIDB") and ON-NET database 122 to ascertain information regarding whether it is a LEC based number and to ascertain the geographic location of the telephone number 111. The LNP database 118 includes information for fixed lines that have been reassigned to another fixed line carrier, the MNP database 120 includes information for mobile phone lines that have been reassigned to another wireless carrier, the LIDB 121 is a nationally maintained database of all active telephone numbers in the North American Dialing plan, while the ON-NET database 122 is a billing clearinghouse specific database of area codes and exchanges for which billing agreements exist with the dominant/default local carrier. If the telephone number 111 of the called party 114 is not located in the CLEC database 116, RMS server 113 queries LNP database 118, MNP database 120, and external LIDB database 121 and ON-NET database 122. Upon verifying that the telephone number 111 of the called party 114 is not a LEC: billable telephone number (i e., not located in a CLEC database), the called party 114, in one non-limiting embodiment, may be required to provide an address, a credit card/debit card billing address and zip code to verify the geographic location of the telephone number 111 associated with the called party 114. In another embodiment, the called party 114 may be required to provide any form of proof of address to verify geographic location, for example, a copy of a telephone bill in the name of the called party 114 indicating address, a utility bill showing address of the called party 114, or other similar types of form of proof of address for positive address verification. The telephone number 111 of the called party 114 is also verified that it is located in the geographic location indicated by the called party 114. In other non-limiting embodiments, RMS server 113 receives call-setup information from a Common Channel Signaling System 7 (also called Signaling System Number 7) and determines whether the call is a forwarded call. The telephone call is terminated if RMS server 113 determines that it is a forwarded call. The RMS server 113 blocks the call if the information indicates it is a forwarded telephone call.

In another embodiment, the called party 114 is mailed a card to set up the authorized account. The card includes a toll free phone number (i.e., an activation telephone number) and code which is used to activate the account. The called party 114 calls the toll free phone number and provides the code to confirm the address. Also, a calling number identification (also called caller id) is retrieved, upon making the call, to determine whether the called party 114 is calling from a telephone number that is in the same geographic location as the telephone number 111 of the called party 114 who is being registered with the new account that is being set up. Upon entering the code from the card into an activation telephone number and positively verifying the geographic location, the called party 114 is authorized in the user database 117.

In operation, all calls originating from the penal institution to telephone number 111 of the called party are billed at a tariff rate that is cheaper to the called party as well as the inmate. Telephone calls placed to the telephone number 111 are redirected to the called party 114 who, in some instances, are located in a different geographic location than the penal institution. The revenue management system 103 of the invention is utilized each time a call is placed by a user of the telephone management system 101. Typically, an inmate will choose at the beginning of the call whether the call will be debit, which utilizes either inmate or the called party funds, or collect. In one non-limiting example, the inmate may dial a "1" prefix for debiting the inmate's funds, a "3" prefix to debit the funds of the called party 114, or a "0" prefix for a collect call, although, the inmate may dial any other prefixes assigned by the institution to place a debit or collect call.

When an outbound telephone call is placed to the telephone number 111 utilizing telephone 105, switchboard device 107, under control of site server 109, routes the telephone call to telephone number 111. Site server 109 utilizes software to dial the telephone number 111, which subsequently connects the telephone call to the proper called party 114. However, before site server 109 directs switchboard device 107 to connect the outbound telephone call to called party 114, site server 109 first sends a query to RMS server 113 to determine if the outbound telephone call is billable and therefore authorized.

To determine if the outbound telephone call is billable, RMS server 113 first accesses RMS database 115 to determine if the telephone number 111 of the called party 114 has an established account containing the telephone number 111. If the outbound telephone number 111 of the called party 114 has an account, RMS server 113 next queries user database 117 to determine the status of the account (i.e., the account is active or not blocked). User database 117 preferably contains financial information for each account in the system.

If the telephone number 111 is not blocked, the user database 117 is next queried to determine if the funds associated with the account are below a predetermined threshold. If the funds located in the account are below the predetermined threshold, the RMS server 113 instructs the site server 109 to play a warning message to the called party 114 where a "3" prefix was dialed, or play a warning message to the inmate where a "1" prefix was dialed. The appropriate warning message based on the prefix will indicate that the funds are low and the account funds will be replenished with additional funds from the credit card of the called party 114 associated with the account or that the inmate is required to deposit additional funds into the account through, in one non-limiting, example, a commissary account, or a credit card of an external party.

If the returned status of the account from user database 117 indicates that the account is active, RMS server 113 sends a signal to site server 109 directing it to allow switchboard 107 to dial the telephone number 111 and complete the outbound telephone call to the called party 114. Once the outbound telephone call has been completed, the site server 109 sends a signal to the RMS server 113 indicative of the length of the telephone call. The RMS server 113 utilizes this information to deduct the appropriate funds from the appropriate inmate's or called party's 114 account depending on how the telephone call was made.

On the other hand, if the outbound telephone call does not have an established account or an account that is currently active, as determined by RMS database 115, RMS server 113 terminates the outbound telephone call and notifies the inmate that an authorized account has not been created or is not active.

Alternatively, if the telephone number 111 associated with the called party 114 does not have an associated account in the RMS database, the user inmate is given the option of placing a collect call by selecting a "0" prefix. The telephone number 111 information is routed from the site server 109 of the telephone management system 101 to the RMS server 113 of the revenue management system 103. The revenue management system 103 next determines if the collect call is billable by checking the dialed telephone number 111 against a CLEC database 116, a LNP database 118, a MNP database, a LIDB database 121, or an ON-NET database 122.

Figure 2:
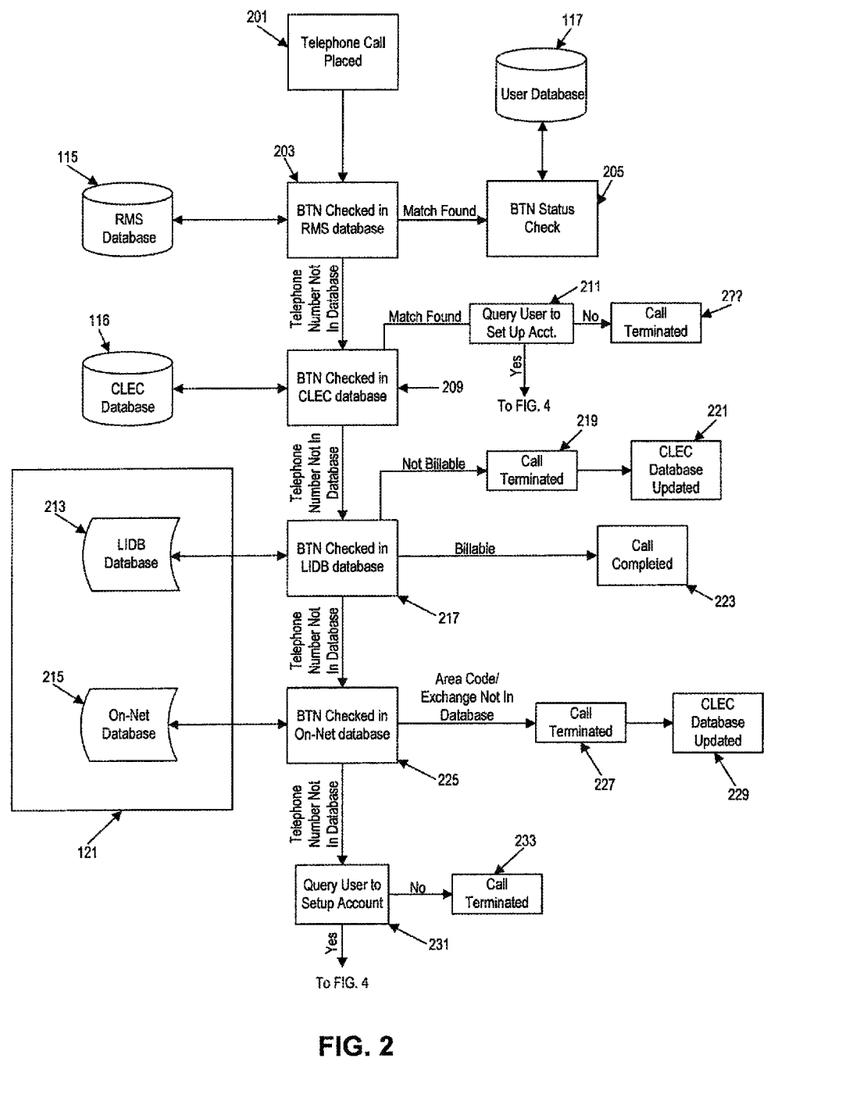
FIG. 2 is a flow diagram of the preferred method of operation of the revenue management system according to the invention showing the process utilized to determine if an outbound telephone number is billable or un-billable.

Referring next to FIG. 2, shown is the call flow diagram depicting the query steps utilized by RMS server 113 to determine if the telephone number 111 associated with the called party 114 has an associated account in revenue management system 103 and, if the telephone number 111 does not have an account, to determine if the outbound telephone call is billable. The revenue management system 103 query begins when an outbound telephone call is placed in step 201 by an inmate, in one non-limiting example, to debit the funds in an account associated with the called party 114. RMS server 113 first accesses RMS database 115 in step 203 to determine the status of the dialed telephone number 111. RMS database 115 contains a list of all telephone numbers having an established account with the revenue management system 103. Telephone numbers stored in RMS database 115 are designated as a good billable number or a revenue management system 103 account telephone number 111, or a blocked telephone number. If the telephone number 111 is located in RMS database 115, RMS server 113 next determines the status of called party's 114 account that is associated with telephone number 111 in step 205.

Figure 3:
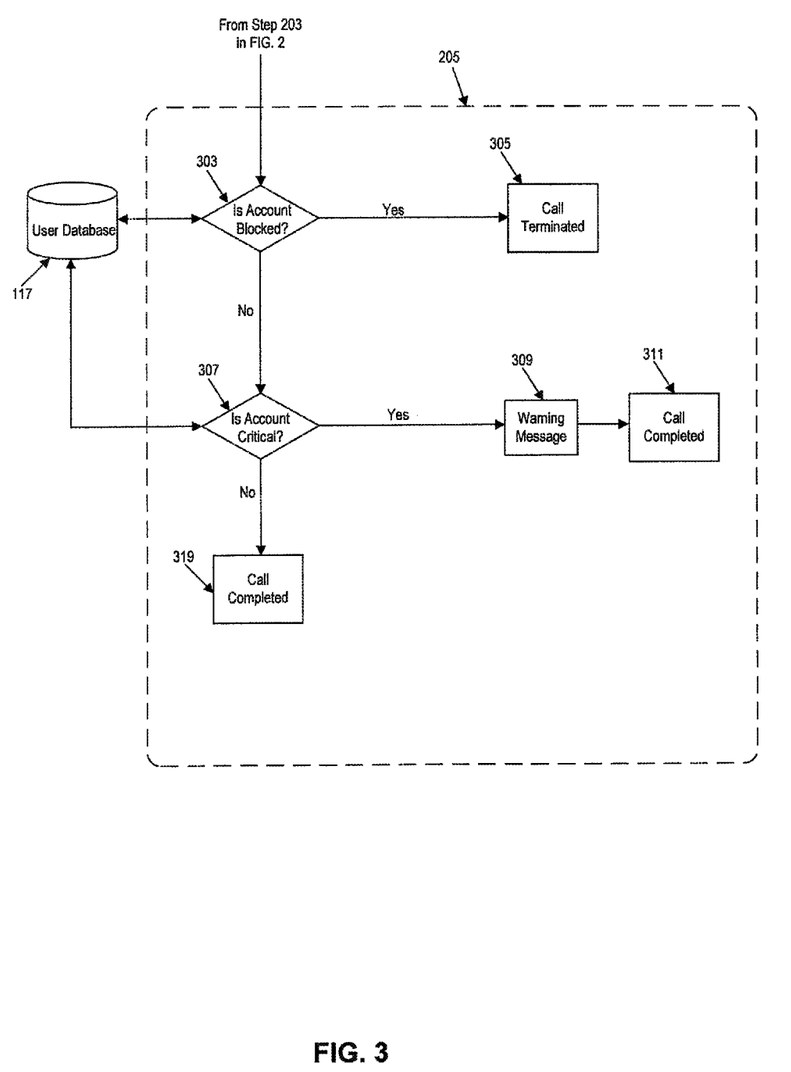
FIG. 3 is a detailed flow diagram of the telephone number Status Check step depicted in FIG. 2.

Shown in FIG. 3 is a detailed flowchart of the process utilized by step 205 to determine the status of any account called party 114 has in RMs database 115. Once it is determined that an account exists in RMS database 115, RMS server 113 queries user database 117 to determine if the account is blocked in step 303. If the telephone number 111 is blocked, RMS server 113 sends a signal to site server 109 directing it to terminate the outbound telephone call in step 305.

If the telephone number 111 is not blocked, RMS server 113 queries user database 117 to determine if the funds associated with the account are below a predetermined threshold in step 307. If the funds located in the account are below the predetermined threshold, RMS server 113 instructs site server 109 to forward the outbound telephone call to called party 114 and plays a warning message to indicate to the called party 114 that the funds located in the account are low in step 309. For example, the warning message may state "The balance of this account is below $15.00. The credit card associated with the account will be charged $50.00 to replenish the account." After the warning message is played to the called party 114, the inmate is connected to the call and the call proceeds. Once the outbound telephone call has been completed in step 311, site server 109 sends a signal to RMS server 113 indicative of the length of the telephone call. RMS server 113 utilizes this information to deduct the appropriate funds from the called party's 114 account stored in user database 117. On the other hand, if the funds located in the account are not below a predetermined threshold, the inmate is connected to the called party 114 and the call proceeds until it is completed in step 319 and appropriate funds deduct the from the called party's 114 account stored in user database 117.

Turning back to FIG. 2, if the dialed telephone number 111 is not found in RMS database 115, RMS server 113 terminates the outbound telephone call in step 209 and notifies the inmate that an authorized account has not been found in user database 117. In order to avoid this action, the called party 114 must have setup an account prior to the inmate placing the telephone call to the telephone number 111. The, called party 114 may create an account in the steps as discussed in more detail below with respect to FIG. 4.

Figure 4:
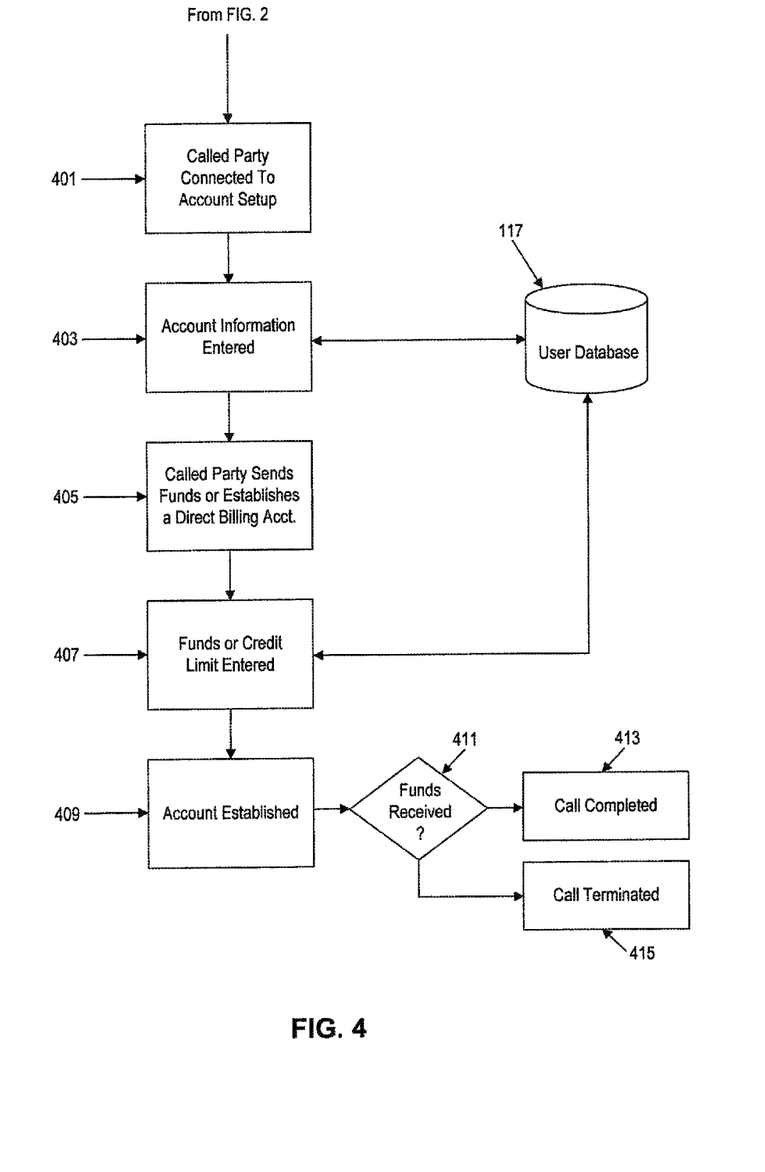
FIG. 4 is a flow diagram depicting the steps for a user to setup an account with the system according to the preferred embodiment of the invention.

As shown in FIG. 4, called party 114 may set up an account by requesting that a telephone number 111 be associated with the called party 114 in the revenue management system 103 for the called party 114 located, in, preferably, an out-of-state geographic location although in another embodiment, the called party 114 may be located in any geographic location. The called party 114 proceeds to set up an account by dialing a toll-free telephone number associated with the revenue management system 103 in step 401. Optionally, the revenue management system 103 may instruct the called party 114 to dial a DTMF digit indicating that they wish to establish a credit account.

If the called party 114 elects to set up an account with the revenue management system 103, the called party 114 is routed to a revenue management system 103 representative. The called party 114 is greeted by RMS representative 119 who acquires account information from called party 114 in step 403 to create an account. The account information may include, in some non-limiting examples, a first and last name, a street address, a city, a state, a zip code, a country of residence, a social security number, a telephone number, a gender (i.e., male or female), a credit card number and associated expiration date, and a bank account number and associated bank routing code. RMS representative 119 enters the received account information into user database 117 as it is received from called party 114. Once all of the required information has been entered by the revenue management system 103 representative, the telephone number 111 of the called party 114 is checked in the Local Exchange Carrier ("LEC") database, a LNP database, or a MNP database in step 405 to determine the geographic location of the called party. The telephone number is checked to determine whether the telephone number provided is a local number (i.e., an LEC billable number), or whether the telephone number has been reassigned to another carrier. Upon determining that the telephone number 111 is not an LEC billable number or has been reassigned, the RMS representative 119 request credit card billing address and zip code in step 407. The RMS representative 119, at this time, may determine whether to perform an online check of the address and zip code in step 409. If an online check is done, then in step 411, the address and zip code are utilized to verify that the credit card information provided is associated with the called party 114 and funds are entered into user database 117 through credit card provided. Alternatively, in step 413, the called party 114 is mailed a card to the address provided by the called party 114 during account setup. The card includes a toll free phone number (or activation telephone number) and code, which is used to activate the account. In step 415, the called party 114 calls the toll free phone number and provides the included code to confirm the address. Also, a calling number identification (also called caller id) is retrieved, upon making the call, to determine whether the called party 114 is calling from a telephone number that is in the same geographic location as the telephone number 111 of the called party 114 being registered in the new account that is being set up. Also, funds are credited into user database 117 through the credit card provided. The account is established upon performing the checks in step 417.

Alternatively, if called party 114 is directed to send funds to an address supplied by RMS representative 119 in order to credit funds to the account and complete setup of the account in step 415. The funds sent to the revenue management service may include a check, a money order, cash, or any other similar payment method. Once the funds are received at the address supplied to called party 114 by RMS representative 119, RMS representative 119 enters the amount of funds into user database 117 and activates called party's 114 account in step 417.

While the invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. A telecommunications management system for avoiding tariff circumvention, comprising:
   a telephone for making a telephone call, wherein the telephone is contained in an institutional telephone management system, and wherein the telephone dials a telephone number of or associated with a called party;
   a revenue management system configured to associate the telephone number with a called party user account, the called party user account including geographic information regarding the location of the called party, wherein the geographic information is verified by an account setup process prior to activation of the called party user account, the account setup process comprising:
      consecutively querying the telephone number against a plurality of remote databases until the telephone number is located or until all of the plurality of databases have been queried; and
      acquiring, from one of the plurality of remote databases when the telephone number is located in the one of the plurality of remote databases, or from the called party when the telephone number has not been found after all of the plurality of databases have been queried, geographic information of the called party associated with the telephone number; and
   a user account database configured to store verified geographic information associated with the called party,
   wherein the revenue management system is further configured to verify the geographic information of the called party using a corresponding credit card address and a credit card zip code associated with the called party, wherein the verifying includes mailing to the called party an activation phone number and a code that when entered during communication with the activation telephone number positively verifies the geographic information and activates the called party user account.

2. The telecommunications management system of claim 1, wherein the revenue management system is further configured to deactivate the called party user account after a predetermined time has passed without successful verification of the geographic information.

3. The telecommunications management system of claim 1, further comprising an institutional server connected to the institutional telephone management system configured to regulate outbound calls originating from an institution.

4. The telecommunications management system of claim 3, wherein the user account database is further configured to process queries from the institutional server to determine if the outbound call is associated with an activated called party user account and if the telephone number is located in a different geographic region than the institution, thereby allowing outbound calls to be charged at an appropriate tariff.

5. The telecommunications management system of claim 1, wherein the revenue management system determines whether the outbound call is associated with an activated called party user account by querying the user account database.

6. The telecommunications management system of claim 1, wherein the institutional server terminates the outbound call if the telephone number is not found in the user account.

7. The telecommunications management system of claim 1, wherein the outbound call is terminated if the called party user account is blocked or disabled.

8. The telecommunications management system of claim 1, wherein the telephone number associated with the called party is a long-distance telephone number, and
wherein the outbound call is billed at a long-distance tariff rate.

9. The telecommunications management system of claim 1, wherein at least one remote database is a Competitive Local Exchange Carrier database, Local Number Portability database, A Mobile Number Portability database, an ON-NET database or a Line Information database.

10. The telecommunications management system of claim 1, wherein the called party user account is billed for the outbound call.

11. A telecommunications method for avoiding tariff circumvention, comprising:
associating a telephone number with a called party user account, the called party user account including geographic information regarding the location of the called party;
activating the called party user account;
verifying the geographic information using an account setup process prior to activation of the called party user account, the account setup process comprising:
consecutively querying the telephone number against a plurality of remote databases until the telephone number is located or until all of the plurality of databases have been queried; and
acquiring, from one of the plurality of remote databases when the telephone number is located in the one of the plurality of remote databases, or from the called party when the telephone number has not been found after all of the plurality of databases have been queried, geographic information of the called party associated with the telephone number; and
verifying that the geographic information of the called party includes a corresponding credit card address and a credit card zip code associated with the called party.

12. The telecommunications method of claim 11, wherein the verifying includes mailing to the called party an activation phone number and a code that when entered during communication with the activation telephone number positively verifies the geographic information.

13. The telecommunications method of claim 11, further comprising deactivating the called party user account after a predetermined time has passed without successful verification of the geographic information.

14. The telecommunications method of claim 11, further comprising:
storing the geographic information regarding the called party in a user account database;
determining if an outbound call is associated with an activated called party user account and if the telephone number is located in a different geographic region than the institution by querying the user account;
transferring the outbound call to the called party if the telephone number is associated with an activated called party user account; and
terminating the outbound call if the telephone number is not found in the user account database.

15. The telecommunications method of claim 11, further comprising terminating the outbound call to the telephone number of or associated with the called party if the called party user account is inactive and providing a notification that the called party user account is not active.

16. The telecommunications method of claim 11, further comprising terminating the outbound call if the called party user account is blocked or disabled.

17. The telecommunications method of claim 11, further comprising billing the outbound call at a long-distance tariff rate,
wherein the telephone number associated with the called party is a long-distance telephone number.

18. The telecommunications method of claim 11, wherein at least one remote database is a Competitive Local Exchange Carrier database, Local Number Portability database, a Mobile Number Portability database, an ON-NET database, or a Line Information database.

19. The telecommunications method of claim 11, further comprising billing the called party user account for the outbound call.

20. The telecommunications management system of claim 1, wherein the revenue management system is further configured to:
receive call-setup information from a Common Channel Signaling System 7;
determine, based on the received call-setup information, whether the telephone call is a forwarded call; and
block the call upon determining that the telephone call is a forwarded call.

* * * * *